United States Patent
Ladroue et al.

(10) Patent No.: US 10,418,660 B2
(45) Date of Patent: Sep. 17, 2019

(54) PROCESS FOR MANUFACTURING A LITHIUM BATTERY

(71) Applicant: STMicroelectronics (Tours) SAS, Tours (FR)

(72) Inventors: Julien Ladroue, Monnaie (FR); Fabien Pierre, Charentilly (FR)

(73) Assignee: STMicroelectronics (Tours) SAS, Tours (FR)

(*) Notice: Subject to any disclaimer, the term of this patent is extended or adjusted under 35 U.S.C. 154(b) by 195 days.

(21) Appl. No.: 15/692,045

(22) Filed: Aug. 31, 2017

(65) Prior Publication Data
US 2018/0233769 A1    Aug. 16, 2018

(30) Foreign Application Priority Data
Feb. 16, 2017  (FR) ..................... 17 51264

(51) Int. Cl.
| | | |
|---|---|---|
| *H01M 10/0525* | (2010.01) | |
| *H01M 4/13* | (2010.01) | |
| *H01M 4/58* | (2010.01) | |
| *H01M 4/136* | (2010.01) | |
| *H01M 4/1391* | (2010.01) | |
| *H01M 10/0567* | (2010.01) | |
| *H01M 10/0562* | (2010.01) | |
| *H01M 10/04* | (2006.01) | |

(52) U.S. Cl.
CPC ......... *H01M 10/0525* (2013.01); *H01M 4/13* (2013.01); *H01M 4/136* (2013.01); *H01M 4/1391* (2013.01); *H01M 4/58* (2013.01); *H01M 10/0562* (2013.01); *H01M 10/0567* (2013.01); *H01M 2010/0495* (2013.01)

(58) Field of Classification Search
CPC ...... H01M 4/13; H01M 4/136; H01M 4/1391; H01M 4/58
See application file for complete search history.

(56) References Cited

U.S. PATENT DOCUMENTS

| | | | |
|---|---|---|---|
| 6,818,356 B1* | 11/2004 | Bates | C01B 21/097 204/192.15 |
| 2004/0018424 A1* | 1/2004 | Zhang | H01M 10/0436 429/162 |
| 2012/0318664 A1* | 12/2012 | Jiang | C23C 14/0676 204/192.1 |
| 2012/0321815 A1* | 12/2012 | Song | H01M 10/052 427/555 |
| 2013/0280581 A1 | 10/2013 | Sun et al. | |
| 2015/0194700 A1 | 7/2015 | Martin et al. | |

FOREIGN PATENT DOCUMENTS

WO    WO-2015112986 A1    7/2015

OTHER PUBLICATIONS

INPI Search Report and Written Opinion for FR 1751264 dated Oct. 3, 2017 (7 pages).

\* cited by examiner

*Primary Examiner* — Matthew J Merkling
(74) *Attorney, Agent, or Firm* — Crowe & Dunlevy

(57) ABSTRACT

In manufacturing a lithium battery, a plasma deposition of a layer of LiPON is made on a structure that includes an anode contact zone and a cathode contact zone. Before making the deposition of layer of LiPON, a conductive portion is deposited to short the anode contact zone to the cathode contact zone. After the deposition of the layer of LiPON in completed, the conductive portion is cut to sever the short between the anode and cathode contact zones.

13 Claims, 6 Drawing Sheets

PROCESS FOR MANUFACTURING A LITHIUM BATTERY

PRIORITY CLAIM

This application claims the priority benefit of French Application for Patent No. 1751264, filed on Feb. 16, 2017, the disclosure of which is hereby incorporated by reference in its entirety to the maximum extent allowable by law.

TECHNICAL FIELD

The present application relates to a process for manufacturing a lithium battery.

BACKGROUND

It is known practice to use lithium batteries in electronic devices such as laptop computers, mobile phones and tablet computers.

Several types of lithium batteries exist, including lithium-ion batteries, lithium-polymer batteries and lithium-metal batteries. Each of these types of batteries is characterized by the materials of which the various elements of the battery are composed. More particularly, lithium-ion batteries can be formed from a cathode made of a lithium compound such as lithium cobalt dioxide ($LiCoO_2$), from a lithium phosphorus oxynitride (LiPON) electrolyte and from a lithium anode. LiPON is a solid electrolyte that makes it possible to produce thin and flexible lithium batteries.

Technical advancement has led to the production of increasingly smaller batteries, resulting in various manufacturing problems. There is a need in the art to overcome all or some of the drawbacks of existing lithium batteries.

SUMMARY

One embodiment makes provision for a process for manufacturing a lithium battery comprising the plasma deposition of LiPON on a structure comprising an anode contact zone and a cathode contact zone, comprising the following steps: before the deposition of LiPON, conductive portions are provided that short the anode contact zone and the cathode contact zone; and after the deposition of LiPON, said portions are cut.

According to one embodiment, the battery comprises a cathode made of $LiCoO_2$.

According to one embodiment, the battery comprises an anode made of lithium.

According to one embodiment, the anode contact zone and the cathode contact zone are made of platinum.

According to one embodiment, the battery additionally comprises, between the anode and the anode contact zone, a metal layer.

According to one embodiment, the metal layer is made of copper.

According to one embodiment, the battery is rectangular in shape.

According to one embodiment, the anode contact zone and the cathode contact zone are positioned in opposite corners of the battery.

According to one embodiment, the anode contact zone and the cathode contact zone are positioned in adjacent corners of the battery.

According to one embodiment, the conductive portions are cut in a step of etching the LiPON.

In an embodiment, a process for manufacturing a lithium battery comprises: depositing, on a structure comprising an anode contact zone and a cathode contact zone, a conductive portion that shorts the anode contact zone and the cathode contact zone; plasma depositing a layer of LiPON on said structure and the conductive portion; and after the plasma deposition of the layer of LiPON, cutting the conductive portion to sever the short of the anode contact zone and the cathode contact zone.

In an embodiment, a process for manufacturing a battery comprises: patterning a metal layer on a substrate to form an anode contact layer and a cathode contact layer; depositing a cathode layer on the cathode contact layer; depositing a conductive portion that electrically shorts the anode contact layer to the cathode layer; plasma depositing an electrolyte layer on the cathode contact layer, the conductive portion and the cathode layer; after the plasma deposition of the electrolyte layer: removing a portion of the electrolyte layer from the anode contact layer and the conductive portion; and cutting the conductive portion to sever the electrical short of the anode contact layer to the cathode layer; and depositing an anode layer on a remaining portion of the electrolyte layer and in electrical connection with the anode contact layer.

BRIEF DESCRIPTION OF THE DRAWINGS

These features and advantages, along with others, will be presented in detail in the following description of particular embodiments, provided without limitation and in relation to the appended figures among which.

DETAILED DESCRIPTION

Identical elements have been denoted by the same references in the various figures and, furthermore, the various figures are not drawn to scale. For the sake of clarity, only those elements which are of use in understanding the described embodiments have been shown and are described in detail.

In the following description, when reference is made to qualifiers of absolute position, such as the terms "left" and "right", etc., or qualifiers of relative position, such as the terms "upper", "lower", etc., reference is being made to the orientation of the figures in a normal position of use. Unless specified otherwise, the expression "of the order of" signifies to within 10%, preferably to within 5%.

By convention, for a battery, the term "anode" refers to the negative electrode and the term "cathode" refers to the positive electrode.

Figure 1A:
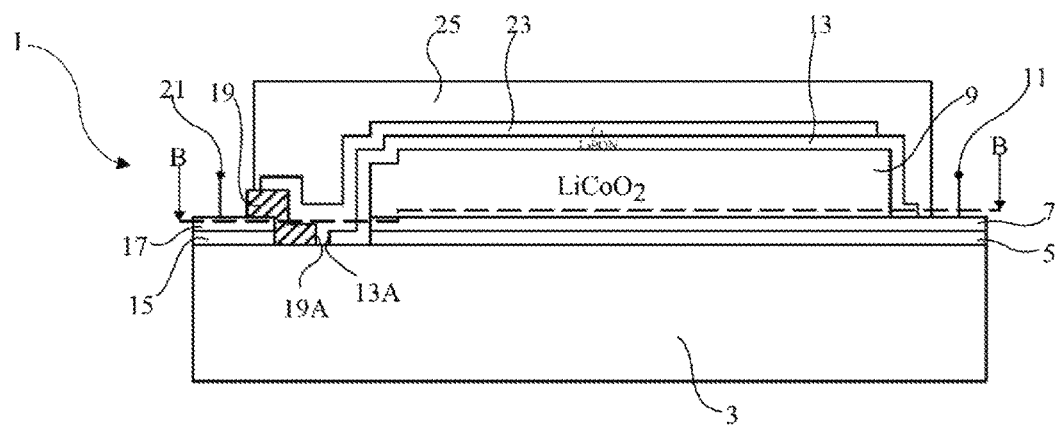
FIGS. 1A and 1B are views in cross section of a lithium battery.
Figure 1B:
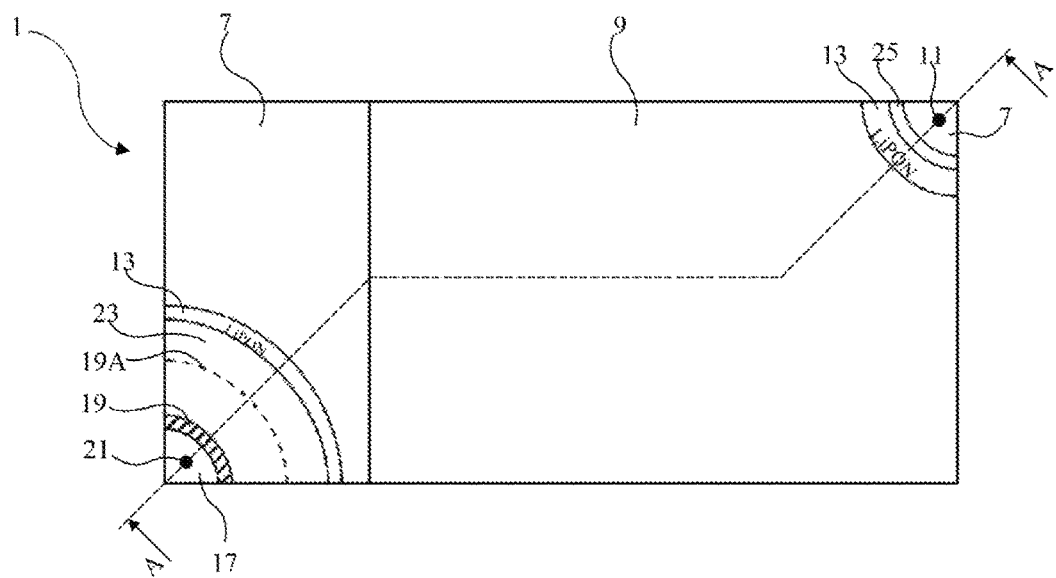

FIGS. 1A and 1B are a view from the side in cross section and a view from above in cross section, respectively, of a lithium battery 1. FIG. 1A is a view in cross section of the battery 1 along the dashed line A-A of FIG. 1B. FIG. 1B is a view in cross section of the battery 1 along the dashed line B-B of FIG. 1A.

As shown in FIG. 1A, the battery 1 is formed on a dielectric substrate 3. The substrate 3 is for example made of zirconium dioxide ($ZrO_2$).

A conductive layer 7 is deposited, potentially on a tie layer 5, over the majority of the substrate 3 (on the right in the figures). The conductive layer 7 is made of a metal, for example of platinum, and it is between 50 nm and 10 μm thick, for example of the order of 100 nm thick. The tie layer 5 is made of lithium cobalt oxynitride (LiCoON), and it is between 50 nm and 10 μm thick, for example of the order of 1 μm thick. The conductive layer 7 is a cathode contact layer. A cathode layer 9, for example made of lithium cobalt dioxide ($LiCoO_2$), lies over the majority of the layer 7. The thickness of the cathode layer is between 2 μm and 50 μm, for example of the order of 10 μm. The remaining portion of the conductive layer 7, which can be seen more clearly in FIG. 1B, constitutes the cathode contact zone 11.

An electrolyte layer 13, made of lithium phosphorus oxynitride (LiPON), lies on the cathode layer 9. The electrolyte layer 13 overruns onto the conductive layer 7 on one side (on the right of the layer 9 in the figures) and onto the substrate 3 on the other side (on the left of the layer 9 in the figures). The thickness of the electrolyte layer 13 is between 500 nm and 5 μm, for example of the order of 2 μm.

A conductive layer 17 is deposited, potentially on a tie layer 15, over a small portion of the substrate 3 (on the left in the figures). The conductive layer 17 is potentially made of a metal of the same nature as the conductive layer 7. The tie layer 15 is potentially of the same nature as the tie layer 5. A layer 19 made of a metal, for example of copper, straddles one end of the conductive layer 17 and the substrate 3. Furthermore, the end 19A of the layer 19 is separated by a distance from the end 13A of the electrolyte layer 13 in order to prevent detrimental changes to the end of the layer 13. The thickness of the metal layer 19 is between 50 nm and 10 μm, for example of the order of 500 nm. The metal layer 19 is hatched in all of the figures. The free portion of the layer 17 forms the anode contact zone 21. The platinum layer 17 and the copper layer 19 form the anode contact.

An anode layer 23 made of lithium covers the majority of the electrolyte layer 13. Furthermore, as shown in FIG. 1B, the anode layer 23 overruns onto the metal layer 19, the end 19A being shown symbolically by dotted lines. The thickness of the anode layer 23 is between 50 nm and 20 μm, for example of the order of 5 μm.

An encapsulation 25 covers the various elements of the battery and leaves only the cathode and anode contact zones 11 and 21 accessible. The encapsulation 25 consists for example of a polyethylene terephthalate (PET) film coated with an aluminum film, also known by the abbreviation alu-PET, to which an adhesive film is added to the aluminum side. The encapsulation 25 is for example positioned by means of rolling. The thickness of the encapsulation 25 is between 5 μm and 150 μm, for example of the order of 100 μm.

FIG. 1B shows an example of a topology of the battery 1 and its contacts. The battery 1 is for example rectangular in shape and may be between 1 and 25 mm long, for example 11 mm long, and between 1 and 25 mm wide, for example 6 mm wide. The cathode contact zone 11 is, for example, positioned in the top right corner of the battery 1. The anode contact zone 21 is, for example, positioned in the bottom left corner of the battery 1. The cathode and anode contact zones are for example in the shape of a quadrant. By way of example, the battery 1 could comprise tongues or protrusions of various shapes on which the anode and cathode terminals could lie. These tongues or protrusions could for example facilitate the stacking and the parallel or series connection of multiple batteries.

The patterns shown can be obtained by producing a localized pattern during deposition (for example using a stencilling technique), or by carrying out a more extensive deposition which would then be etched, for example by laser, this second method being used for the manufacturing process presented here.

Figure 2A:
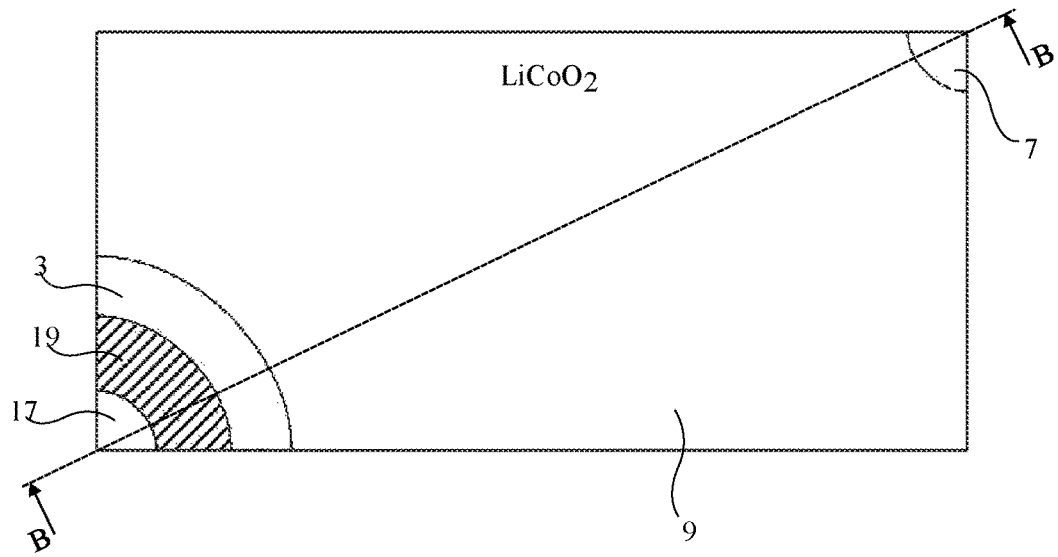
FIGS. 2A, 2B and 3 are a view from above and views in cross section illustrating steps of a process for manufacturing the battery of FIGS. 1A and 1B.
Figure 2B:
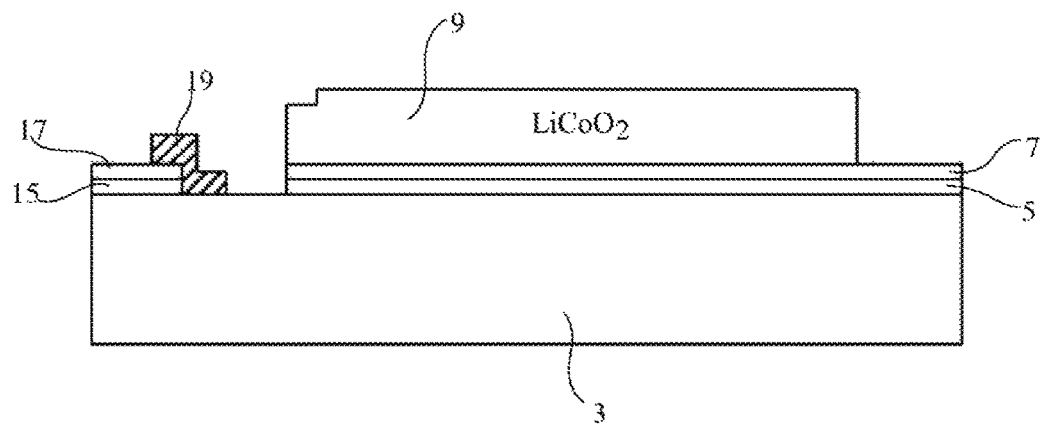

FIGS. 2A and 2B are a view from above and a view in cross section, respectively, illustrating the battery of FIGS. 1A and 1B in an intermediate manufacturing step. FIG. 2A is a view from above of FIG. 2B. FIG. 2B is a view in cross section along the line B-B of FIG. 2A. At this stage, the following steps are carried out in succession:

depositing a tie layer and a metal layer, for example a platinum layer, on the substrate 3, then etching a trench in order to obtain the layers 5, 7 over the majority of the substrate 3 and the layers 15, 17 over the remaining portion;

depositing a cathode layer 9 over the majority of the layer 7; and depositing a layer, for example a copper layer, in the trench separating the layers 5, 7 from the layers 15, 17 and overrunning onto the layer 17 and the cathode layer 9, then etching it to form the layer 19.

Figure 3:
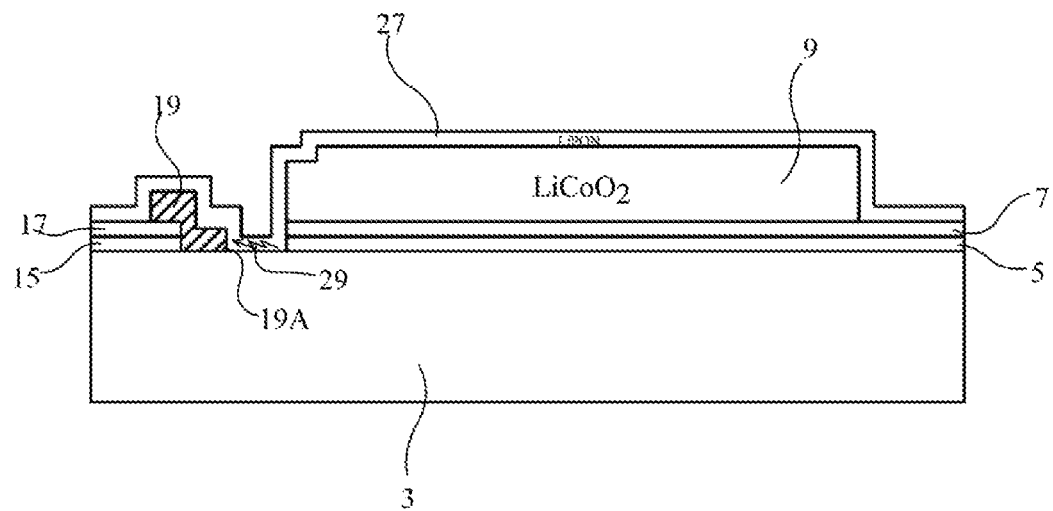

FIG. 3 is a view in cross section illustrating the structure of FIG. 2 in a later manufacturing step. A LiPON layer 27 is deposited on the structure. This deposition is carried out conventionally by plasma deposition, which process is commonly called PVD (physical vapor deposition). In this step, the conductive layers, i.e. the layers 7 and 9, forming the cathode and the cathode contact, and the layers 17 and 19, forming the anode contact, are charged under the effect of the plasma present in the deposition reactor. However, the area of the layers 7 and 9 is larger than that of the layers 17 and 19. This leads to a potential difference between the cathode and anode contacts, and a risk of electric arc formation. More particularly, electric arcs, represented symbolically by an arrow 29, are liable to be formed through the portion of the layer 27 between the end 19A of the copper layer 19 and the end facing the conductive layer 7. Such electric arcs lead to the occurrence of faults, for example the formation of cavities in the layer 27.

After the step of FIG. 3, the structure of FIGS. 1A and 1B is obtained by etching the LiPON layer 27 in order to form the electrolyte layer 13, followed by a localized deposition of lithium in order to form the anode layer 23 presented in relation to FIG. 1B. In the lithium deposition step, lithium penetrates into the cavities made in the electrolyte layer 13 by potential electric arcs 29 formed in the step of FIG. 3, and this may create short circuits between the anode and the cathode of the battery. One possible solution to this problem is to increase the distance between the end 19A of the copper layer 19 and the end facing the conductive layer 7, but this decreases the area available for the cathode layer 9 and hence the capacity of the battery for a given substrate area.

Figure 4A:
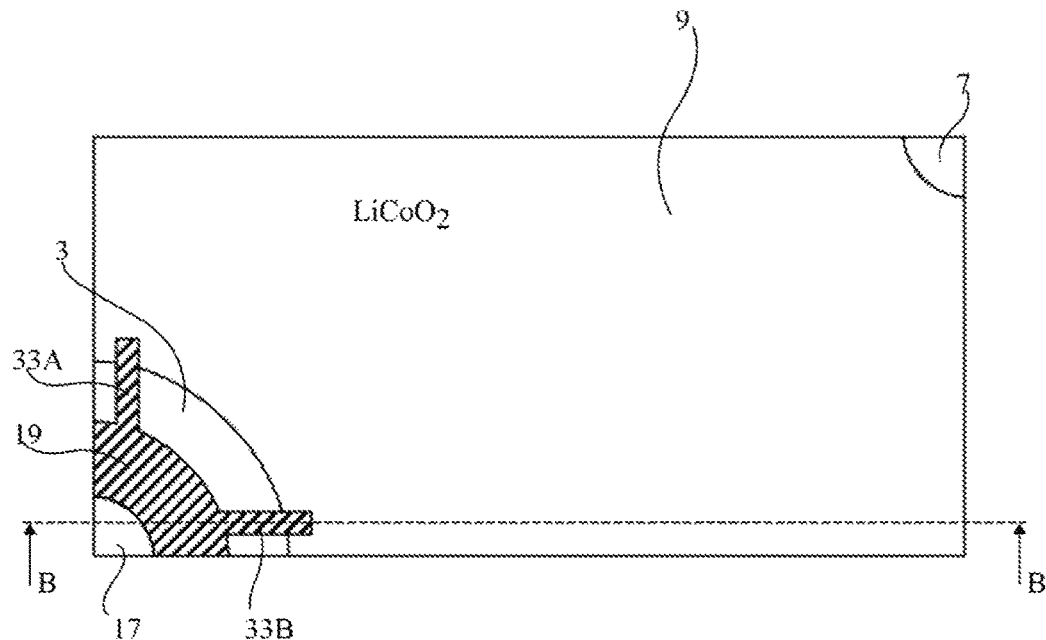
FIGS. 4A, 4B, 5, 6A and 6B are views in cross section and views from above illustrating steps of one embodiment of a process for manufacturing the battery of FIGS. 1A and 1B.
Figure 4B:
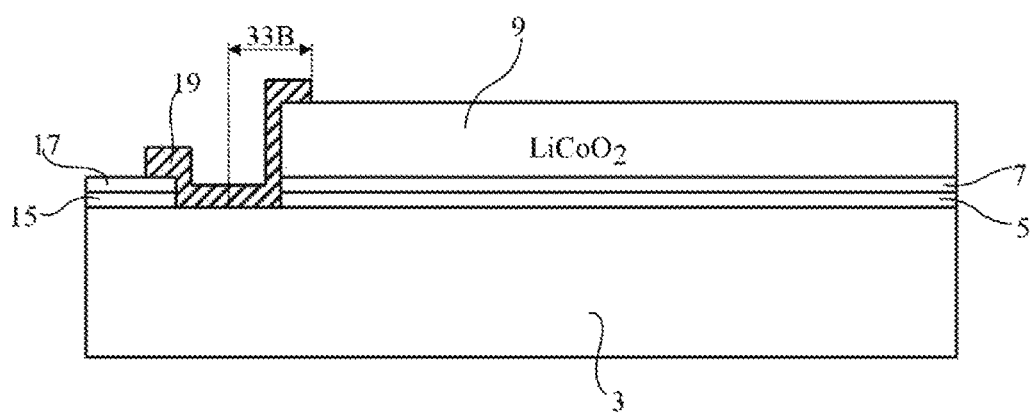

FIGS. 4A and 4B are a view from above and a view in cross section, respectively, illustrating the battery of FIGS. 1A and 1B in an intermediate step of one embodiment of a process for manufacturing this battery. FIG. 4B is a view in cross section of FIG. 4A along the line B-B of FIG. 4A. At this stage, the same steps as those carried out in the step illustrated by FIGS. 2A and 2B have been carried out in succession. However, in order to overcome the problem described in relation to FIG. 3, the cathode contact and the anode contact are shorted. Thus, during the plasma deposition of the LiPON layer, the cathode and anode contacts remain at one and the same potential level when they are charged. In order to create this short circuit, in the embodiment shown, the copper layer 19 comprises at least one extension the end of which lies on a portion of the cathode layer 9. In the case shown in FIGS. 4A and 4B, the layer 19 comprises two extensions 33A and 33B. The extensions 33A and 33B are for example in the shape of tongues.

Figure 5:
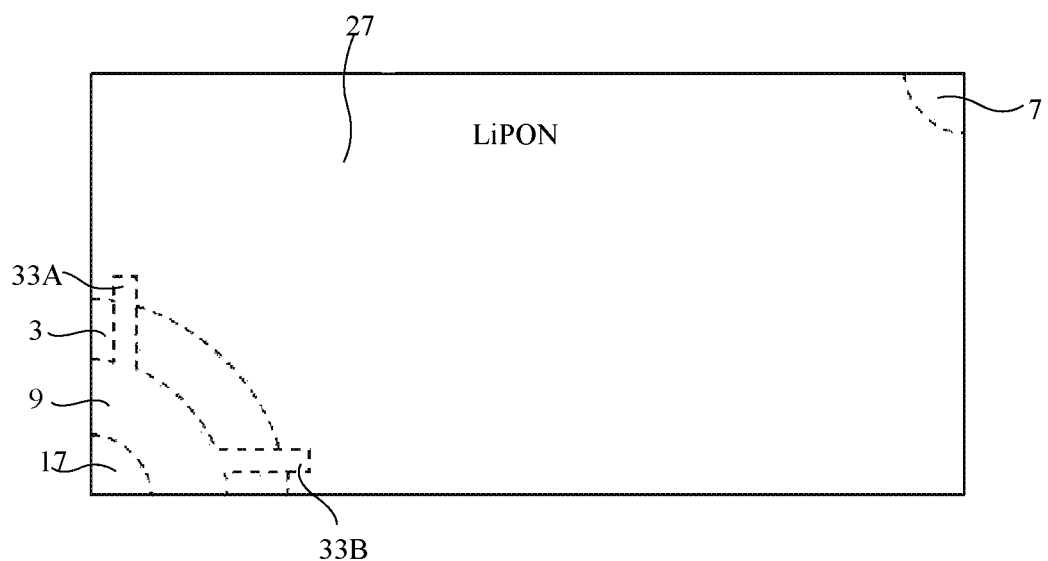

FIG. 5 is a view from above of the structure of FIGS. 4A and 4B in a later manufacturing step. A LiPON layer 29 is deposited on the structure, for example by means of plasma deposition. The shape of the various layers forming the structure of FIG. 4A is shown by dotted lines. During the LiPON deposition operation, the conductive layers, such as the platinum layers 7 and 17, the copper layer 19 and the cathode layer 9, are charged. Since all of these layers have been shorted, they are all at one and the same potential. The formation of electric arcs, and hence faults in the LiPON layer, is thus prevented.

Figure 6A:
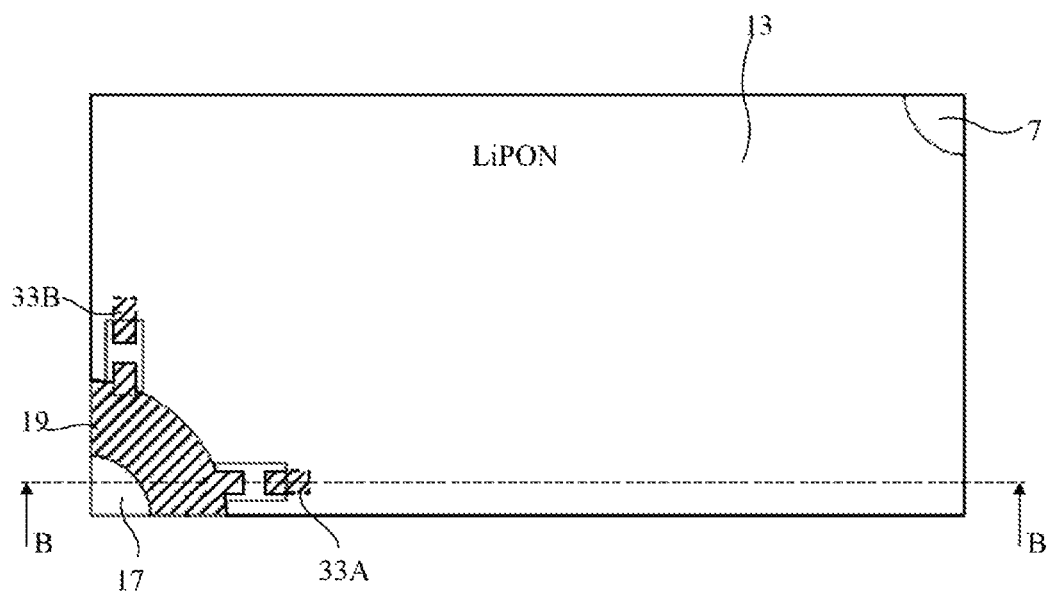
Figure 6B:
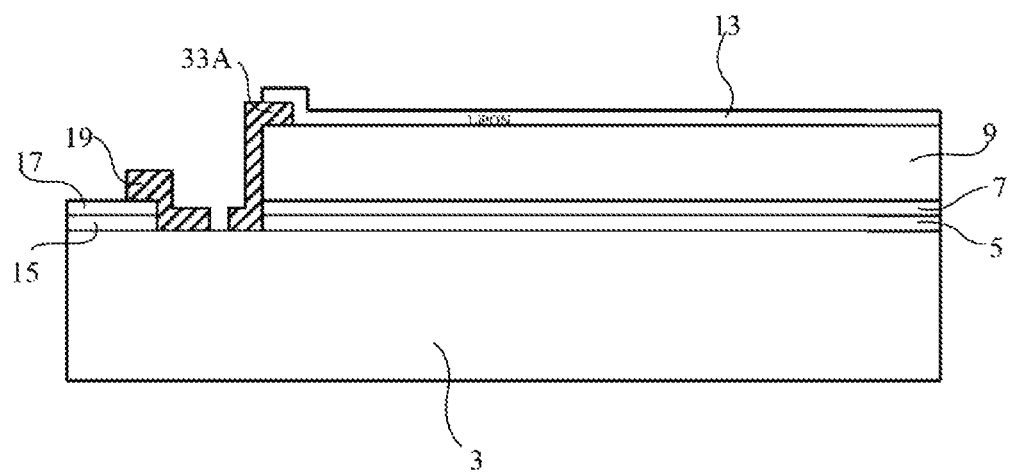

FIGS. 6A and 6B are a view from above and a view in cross section, respectively, of the structure of FIG. 5 in a still later manufacturing step. FIG. 6A is a view from above. FIG. 6B is a view in cross section along the line B-B of FIG. 6A. In this step, the LiPON layer 27 is etched locally so as to make the conductive layer 7, the conductive layer 17, the copper layer 19 and a portion of the extensions 33A and 33B accessible. Next, the extensions 33A and 33B are sectioned, for example by laser etching. Thus, the anode contact is disconnected from the cathode contact. Portions of extensions 33A and 33B may remain on the cathode layer 9 and below the layer 13. These portions are shown by dotted lines and are hatched in FIG. 6A. The remaining portions of the extensions 33A and 33B may extend beyond or be in line with the layer 13.

In later steps, the anode layer 23, presented in relation to FIG. 1B, is deposited on the structure in a localized manner such that the extensions 33A and 33B do not make electrical contact with the conductive layer 7 at the zone 11. In the case of a deposition of the layer 23 covering all or part of the above-mentioned elements, those skilled in the art will have provided adequate electrical insulation between these elements in order to prevent the shorting of the anode and of the cathode in this step of the process. Next, the encapsulation layer 25, presented in relation to FIGS. 1A and 1B, is put in place.

One advantage of this embodiment is that it makes it possible to decrease the distances separating the layers 9, 13 and 19, and hence to increase the area that can be allocated to other elements of the battery.

Particular embodiments have been described. Various variants and modifications will be apparent to those skilled in the art. In particular, any other methods allowing the cathode and anode contacts to be temporarily shorted during the LiPON deposition operation could be used.

The invention claimed is:

1. A process for manufacturing a lithium battery, comprising:
   depositing, on a structure comprising an anode contact zone and a cathode contact zone, a conductive portion that shorts the anode contact zone and the cathode contact zone;
   plasma depositing a layer of LiPON on said structure and the conductive portion; and
   after the plasma deposition of the layer of LiPON, cutting the conductive portion to sever the short of the anode contact zone and the cathode contact zone.

2. The process according to claim 1, further comprising, prior to depositing, forming the cathode contact zone to include a cathode made of a layer of $LiCoO_2$.

3. The process according to claim 1, further comprising, after cutting, depositing a layer of lithium over the layer of LiPON to provide an anode that is electrically connected to the anode contact zone.

4. The process according to claim 1, further comprising, before cutting, patterning the layer of LiPON to remove a portion of the layer of LiPON from the anode contact zone.

5. The process according to claim 1, wherein the anode contact zone and the cathode contact zone are made of platinum.

6. The process according to claim 1, wherein the conductive portion is a metal layer made of copper.

7. The process according to claim 1, wherein the battery has a rectangular shape.

8. The process according to claim 7, wherein the anode contact zone and the cathode contact zone are positioned in opposite corners of the rectangular shape.

9. The process according to claim 7, wherein the anode contact zone and the cathode contact zone are positioned in adjacent corners of the rectangular shape.

10. The process according to claim 1, further comprising performing an etch to pattern the layer of LiPON to remove a portion of the layer of LiPON from the anode contact zone and further cut the conductive portion.

11. A process for manufacturing a battery, comprising:
    patterning a metal layer on a substrate to form an anode contact layer and a cathode contact layer;
    depositing a cathode layer on the cathode contact layer;
    depositing a conductive portion that electrically shorts the anode contact layer to the cathode layer;
    plasma depositing an electrolyte layer on the cathode contact layer, the conductive portion and the cathode layer;
    after the plasma deposition of the electrolyte layer:
      removing a portion of the electrolyte layer from the anode contact layer and the conductive portion; and
      cutting the conductive portion to sever the electrical short of the anode contact layer to the cathode layer; and
    depositing an anode layer on a remaining portion of the electrolyte layer and in electrical connection with the anode contact layer.

12. The method of claim 11, wherein:
    the cathode layer is made of $LiCoO_2$;
    the electrolyte layer is made of LiPON; and
    the anode layer is made of Li.

13. The method of claim 11, wherein removing and cutting are performed using an etching process.

* * * * *